J. Hanauer & N. Sartor's,
Corset Spring.

No. 104,022.    Patented June 7, 1870.

Inventor
Joseph Hanauer
Nicholas Sartor
per
Van Santvoord & Stauff
Attys

Witnesses:
C. Wahlers
E. F. Kastenhuber

UNITED STATES PATENT OFFICE.

JOSEPH HANAUER AND NICHOLAS SARTOR, OF NEW YORK, N. Y.

IMPROVEMENT IN CORSET-SPRINGS.

Specification forming part of Letters Patent No. 104,022, dated June 7, 1870.

*To all whom it may concern:*

Be it known that we, JOSEPH HANAUER and NICHOLAS SARTOR, of the city, county, and State of New York, have invented a new and useful Improvement in Corset-Springs; and we do hereby declare the following to be a full, clear, and exact description thereof, which will enable those skilled in the art to make and use the same, reference being had to the accompanying drawing, forming part of this specification, in which drawing—

Figure 1:
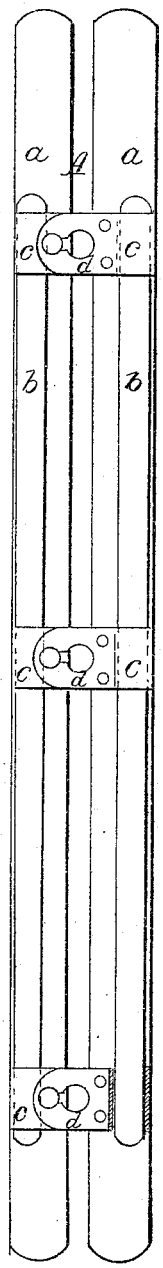
Figure 2:

Figure 1 represents a sectional front view of this invention. Fig. 2 is a transverse section of the same.

Similar letters indicate corresponding parts.

This invention relates to a corset-spring composed of two leaves, the secondary leaf being inserted loosely into eyes formed by the shanks of the clasps or fastenings, which are firmly connected to the main leaf in such a manner that by said secondary leaf the strength and elasticity of the corset-spring is increased, and at the same time the secondary leaf is free to creep or slide in a longitudinal direction each way on the main leaf, and therefore, if the spring is bent, the two leaves have no tendency to spread open, and the injury produced by the spreading of the ordinary double-leaf springs is avoided.

In the drawing, the letter A designates a corset-spring, each part of which is composed of two leaves, *a b*. These two leaves are held together by eyes *c*, formed by the clasps or fastenings *d*, which are riveted or otherwise secured to the main leaves *a*, said eyes being just large enough to receive the secondary leaves *b*. By these means the two leaves are united in such a manner that the secondary leaf can be removed or inserted at any time; and, furthermore, in bending the spring, the secondary leaves are free to creep over the main leaves, so that the leaves are not liable to spread in bending.

If the secondary leaves are riveted or otherwise firmly secured to the main leaves, and the spring is bent, the two leaves have a tendency to spread open, and thereby the covering of the spring is torn. This disadvantage is obviated by our spring, and at the same time the full benefit of the secondary leaves in increasing the strength is gained.

Our spring can be made cheap. The leaves are not weakened by rivet-holes, and if either of the leaves breaks, the other can be detached from it and used the same as before.

We do not claim, broadly, as our invention, a corset-spring each part of which is composed of two leaves; but,

Having thus described our invention, what we claim as new, and desire to secure by Letters Patent, is—

The main springs *a a*, provided with secondary removable springs *b b*, held in place by and movable within eyes C C, formed by the clasps or fastenings *d d*, the whole constructed and operating together substantially as herein shown and described.

This specification signed by us this 19th day of April, 1870.

JOSEPH HANAUER.
NICHOLAS SARTOR.

Witnesses:
W. HAUFF,
E. F. KASTENHUBER.